United States Patent
Yang et al.

(10) Patent No.: US 11,152,862 B2
(45) Date of Patent: Oct. 19, 2021

(54) POWER CONTROLLERS AND CONTROL METHODS FOR REDUCING OUTPUT VOLTAGE RIPPLE WHEN LINE VOLTAGE IS LOW

(71) Applicant: Leadtrend Technology Corporation, Zhubei (TW)

(72) Inventors: Fong Cheng Yang, Zhubei (TW); Kuan Hsien Chou, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 35 days.

(21) Appl. No.: 16/460,206

(22) Filed: Jul. 2, 2019

(65) Prior Publication Data

US 2020/0036290 A1    Jan. 30, 2020

(30) Foreign Application Priority Data

Jul. 25, 2018    (TW) .................................. 107125741

(51) Int. Cl.
*H02M 3/335* (2006.01)
*H02M 3/24* (2006.01)
*H02M 1/00* (2006.01)

(52) U.S. Cl.
CPC ............... *H02M 3/24* (2013.01); *H02M 1/00* (2013.01); *H02M 3/3353* (2013.01); *H02M 1/0009* (2021.05); *H02M 3/335* (2013.01)

(58) Field of Classification Search
CPC . H02M 2001/0003; H02M 2001/0009; H02M 2001/0012; H02M 3/335; H02M 3/33507; H02M 3/3353; H02M 3/33538; H02M 3/33523; H02M 7/12; H02M 7/125; H02M 7/155; H02M 1/08; H02M 1/14
See application file for complete search history.

(56) References Cited

U.S. PATENT DOCUMENTS

| 6,944,034 | B1 * | 9/2005 | Shteynberg | ....... H02M 3/33523 363/21.13 |
| 7,671,578 | B2 * | 3/2010 | Li | ........................ G01R 15/183 324/72 |
| 8,482,208 | B2 * | 7/2013 | Lin | ..................... H02M 1/4225 315/185 R |
| 2013/0094253 | A1 * | 4/2013 | Yang | ................. H02M 3/33507 363/21.15 |

(Continued)

FOREIGN PATENT DOCUMENTS

CN                104734506 A   *   6/2015

*Primary Examiner* — Thienvu V Tran
*Assistant Examiner* — Shahzeb K Ahmad
(74) *Attorney, Agent, or Firm* — McClure, Qualey & Rodack, LLP (57) ABSTRACT

Disclosure includes a control method in use of a switching-mode power supply that supplies an output voltage to a load. A line voltage generated by rectifying an alternating-current voltage is detected to compare with a first reference voltage. A control signal is generated in response to the comparison of the line voltage and the first reference voltage. When the line voltage is less than the first reference voltage, the control signal is used to increase converted power that the switching-mode power supply provides to the output voltage. When the line voltage is not less than the first reference voltage, the control signal has no influence to the converted power.

20 Claims, 10 Drawing Sheets

(56) References Cited

U.S. PATENT DOCUMENTS

| | | | | |
|---|---|---|---|---|
| 2015/0155786 | A1* | 6/2015 | Shen | H02M 1/32 |
| | | | | 363/15 |
| 2017/0126132 | A1* | 5/2017 | Chen | H02M 1/32 |
| 2017/0149340 | A1* | 5/2017 | Ye | H02M 3/33507 |
| 2017/0353167 | A1* | 12/2017 | Eum | H05B 45/395 |

* cited by examiner

POWER CONTROLLERS AND CONTROL METHODS FOR REDUCING OUTPUT VOLTAGE RIPPLE WHEN LINE VOLTAGE IS LOW

CROSS-REFERENCE TO RELATED APPLICATION

This application claims priority to and the benefit of Taiwan Application Series Number 107125741 filed on Jul. 25, 2018, which is incorporated by reference in its entirety.

BACKGROUND

The present disclosure relates generally to power controllers and control methods in use of switching-mode power supplies, and, more particularly, to switching-mode power supplies using primary-side regulation (PSR).

Power supplies are almost required for all electronic appliances. A power supply can convert, for example, the alternative-current (AC) voltage from a power grid into the power source with ratings that an electric appliance needs for its core circuit. Among all power supplies, switching-mode power supplies are renowned for their efficient power conversion and compact size, making them popularly welcomed in the art of power management industry.

A common practice for power switching-mode power supplies is to convert the AC voltage from a power grid into a direct-current (DC) line voltage, which is then converted into an output voltage with required current or voltage ratings. When powering a heavy load, the line voltage could have ripples in response to the constant vibration of the AC voltage. System bandwidth of a switching-mode power supply could be too narrow to compensate the effect due to the ripples of the line voltage, causing the output voltage having unacceptable ripples beyond ratings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein:

FIG. 2B demonstrates some signal waveforms in FIG. 1 when FIG. 1 uses power controller 12a;

FIG. 5 demonstrates some signal waveforms in FIG. 1 when power controller 12 in FIG. 1 is replaced by power controller 42a;

DETAILED DESCRIPTION

Figure 1:
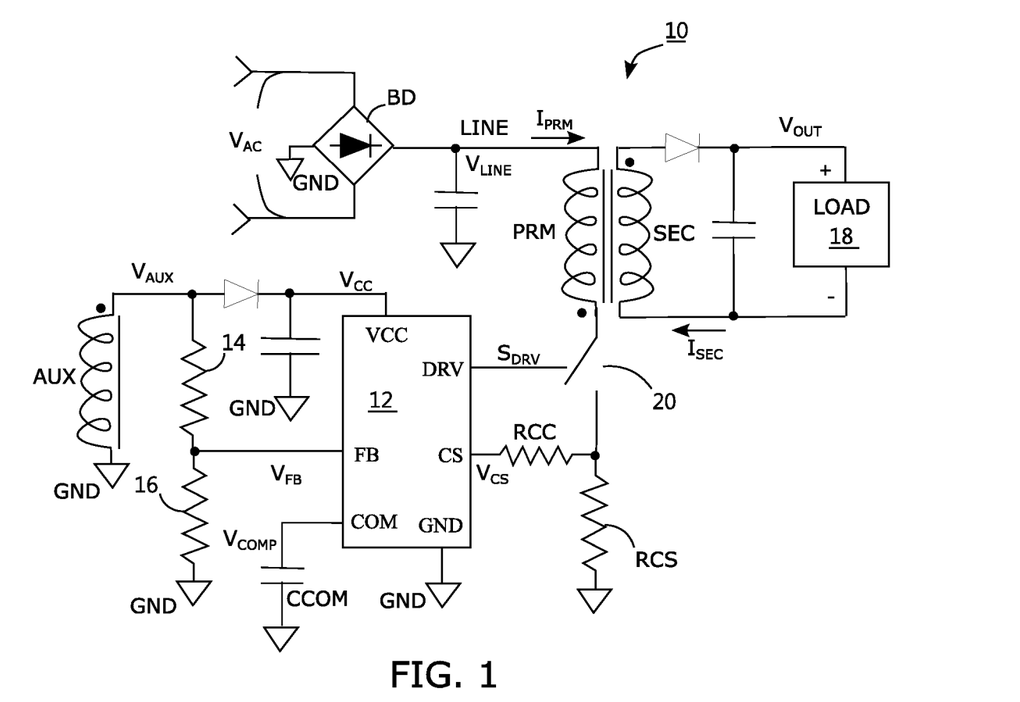
FIG. 1 shows switching-mode power supply 10 with a flyback topology.

FIG. 1 shows switching-mode power supply 10 with a flyback topology. Switching-mode power supply 10 has bridge rectifier BD to rectify AC voltage $V_{AC}$ from a power grid and, in response, provide line voltage $V_{LINE}$. Power controller 12, which could be a packaged integrated circuit for some embodiments of the invention, generates driving signal $S_{DRV}$, a pulse-width modulation signal, to turn ON and OFF power switch 20, thereby controlling the magnetization or de-magnetization of the transformer including primary winding PRM, auxiliary winding AUX and secondary winding SEC, inductively coupled to each other. When power switch 20 is ON, conducting current, primary winding PRM is magnetized to store magnetic energy as inductor current $I_{PRM}$ through primary winding PRM increases linearly over time. When power switch 20 is OFF, performing an open circuit, the transformer demagnetizes, so secondary winding SEC, with the help of rectification from the secondary side, provides induced current $I_{SEC}$ and generates output voltage $V_{OUT}$ to supply load 18 electric power.

Current-sensing node CS of power controller 12 is connected via resistor RCC to the joint between power switch 20 and current-sensing resistor RCS. Current-sensing signal $V_{CS}$ at current-sensing node CS could represent inductor current $I_{PRM}$ through primary winding PRM.

Switching-mode power supply 10 employs primary-side regulation (PSR), solely relying on the information from the primary side to regulate output voltage $V_{OUT}$ at the secondary side. Power controller 12 detects output voltage $V_{OUT}$ from feedback node FB to generate compensation signal $V_{COMP}$, which determines ON time $T_{ON}$, OFF time $T_{OFF}$ and switching frequency $f_{SW}$ of power switch 20. As shown in FIG. 1, voltage-dividing resistors 14 and 16 connect in series between the two ends of auxiliary winding AUX, and have a common joint denoted as feedback node FB providing feedback voltage $V_{FB}$. Connected to compensation node COM of power controller 12 is compensation capacitor CCOM, across which compensation signal $V_{COMP}$ resides.

Figure 2A:
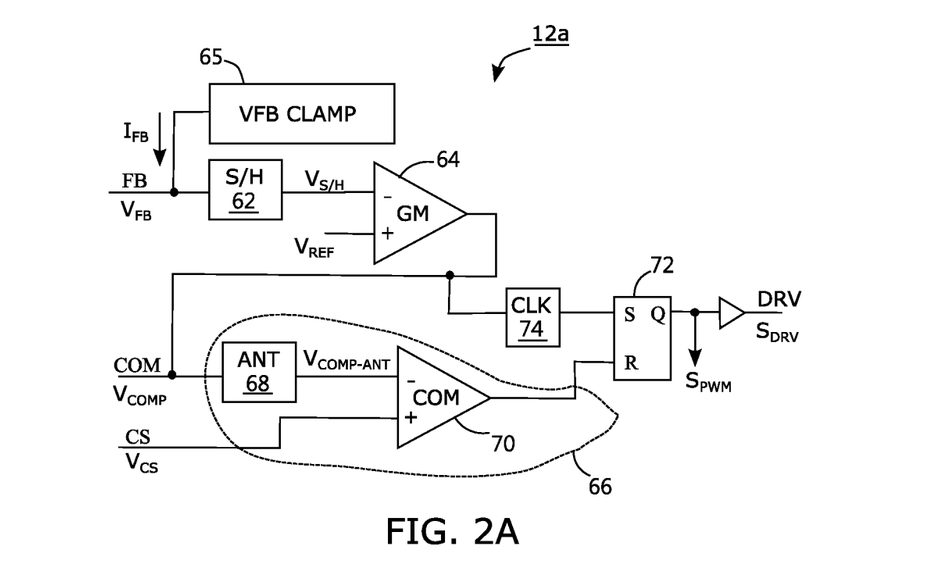
FIG. 2A shows power controller 12a capable of replacing power controller 12 in FIG. 1 according to embodiments of the invention.
Figure 2B:
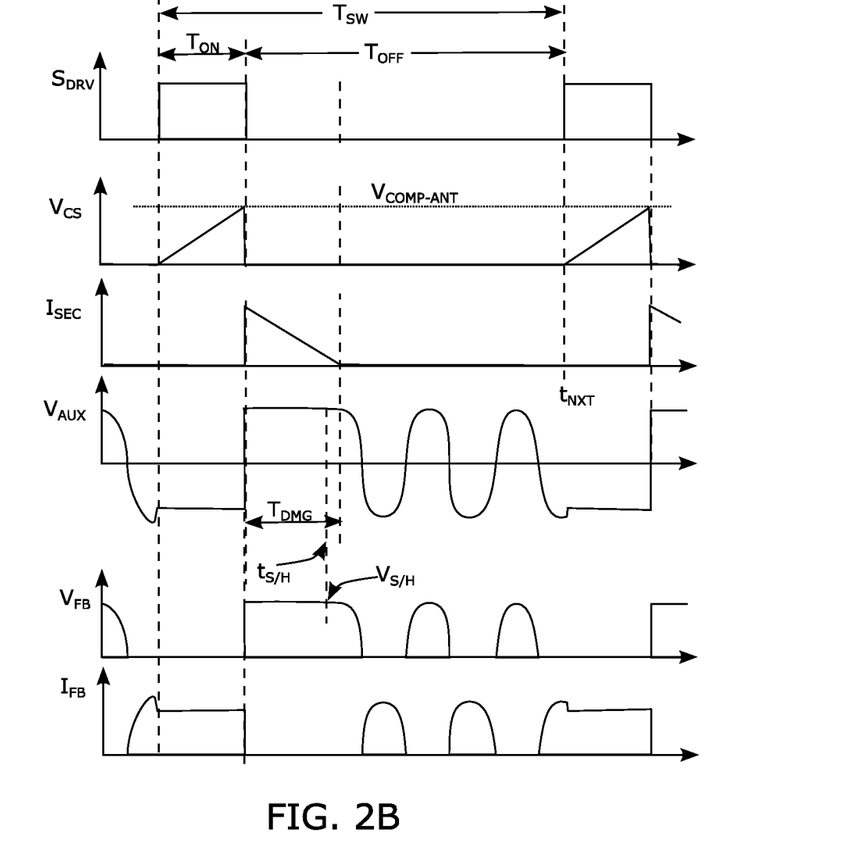

Please refer to FIGS. 2A and 2B. FIG. 2A shows power controller 12a capable of replacing power controller 12 in FIG. 1 according to embodiments of the invention. FIG. 2B demonstrates some signal waveforms in FIG. 1 when FIG. 1 uses power controller 12a.

Driving signal $S_{DRV}$ decides ON time $T_{ON}$ during which power switch 20 is ON, and OFF time during which power switch 20 is OFF. One cycle time $T_{SW}$ consists of an ON time $T_{ON}$ and an OFF time $T_{OFF}$, as demonstrated by FIG. 2B. As ON time $T_{ON}$ continues, inductor current $I_{PRM}$ increases linearly over time, and so does current-sensing signal $V_{CS}$.

ON-time controller 66 determines the length of ON time $T_{ON}$ in response to compensation signal $V_{COMP}$ and current-sensing signal $V_{CS}$. Attenuator 68 in ON-time controller 66 attenuates compensation signal $V_{COMP}$ to provide another compensation signal $V_{COMP-ANT}$. Attenuator 68 includes, for example, two resistors connected in series between compensation node COM and input ground where the joint between these two resistors provides compensation signal $V_{COMP-ANT}$. Once current-sensing signal $V_{CS}$ exceeds compensation signal $V_{COMP-ANT}$, comparator 70 resets SR flip-flop 72, making both PWM signal $S_{PWM}$ and driving signal $S_{DRV}$ "0" in logic and ending ON time $T_{ON}$, as demonstrated by the waveforms of driving signal $S_{DRV}$ and current-sensing signal $V_{CS}$.

The waveform of current $I_{SEC}$ through secondary winding SEC shows that secondary winding SEC starts releasing its magnetic energy at the beginning of OFF time $T_{OFF}$, and current $I_{SEC}$ decreases linearly over time during demagnetization time $T_{DMG}$. As the magnetic energy of secondary winding SEC depletes, current $I_{SEC}$ becomes 0A at the end of demagnetization time $T_{DMG}$.

Clock generator 74 in FIG. 2A, an oscillator for example, periodically sets SR flip-flop 72 in response to compensation signal $V_{COMP}$, to end OFF time $T_{OFF}$ and start ON time $T_{ON}$. As illustrated in FIG. 2B, clock generator 74 sets SR flip-flop 72 at moment $t_{NXT}$, so next ON time $T_{ON}$ starts.

FIG. 2B also shows the waveform of winding voltage $V_{AUX}$. During ON time $T_{ON}$, winding voltage $V_{AUX}$ is about a negative constant, reflecting the value of line voltage $V_{LINE}$. During demagnetization time $T_{DMG}$, nevertheless, winding voltage $V_{AUX}$ becomes about a positive constant, reflecting the value of output voltage $V_{OUT}$. After demagnetization time $T_{DMG}$, winding voltage $V_{AUX}$ starts oscillating, because of the resonant circuit substantially consisting of primary winding PRM and the parasitic capacitor residing at the joint between power switch 20 and primary winding PRM, and this oscillation continues until moment $t_{NXT}$ when clock generator 74 sets SR flip-flop 72.

Power controller 12a in FIG. 2A has voltage clamper 65, which provides feedback current $I_{FB}$ and clamps feedback voltage $V_{FB}$ to be about 0V when auxiliary voltage $V_{AUX}$ is negative. As demonstrated in FIG. 2B, the waveform of feedback voltage $V_{FB}$ is similar to the positive portion of the waveform of auxiliary voltage $V_{AUX}$, and that of feedback current $I_{FB}$ is inversely similar with the negative portion of the waveform of auxiliary voltage $V_{AUX}$.

Sample-and-hold circuit 62 in FIG. 2A samples feedback voltage $V_{FB}$ to hold representative voltage $V_{S/H}$ at sample moment $t_{S/H}$ within demagnetization time $T_{DMG}$. As feedback voltage $V_{FB}$ during demagnetization time $T_{DMG}$ somehow reflects output voltage $V_{OUT}$, sample-and-hold circuit 62 equivalently detects output voltage $V_{OUT}$ via feedback node FB and accordingly generates representative voltage $V_{S/H}$.

Transconductor 64 in FIG. 2A compares representative voltage $V_{S/H}$ with reference voltage $V_{REF}$, and, based on the difference between them, provides current to charge or discharge compensation capacitor CCOM, so compensation signal $V_{COMP}$ is built. As aforementioned, representative voltage $V_{S/H}$ can represent output voltage $V_{OUT}$, so transconductor 64 equivalently compares output voltage $V_{OUT}$ with a target voltage corresponding to reference voltage $V_{REF}$, to generate compensation signal $V_{COMP}$.

When output voltage $V_{OUT}$ is controlled to be about the target voltage, representative voltage $V_{S/H}$ is substantially equal to reference voltage $V_{REF}$, and compensation signal $V_{COMP}$ remains about unchanged.

Due to the limitation of bandwidth, power controller 12a might not respond quickly enough to compensate the impact of riddles of line voltage $V_{LINE}$ on output voltage $V_{OUT}$. When line voltage $V_{LINE}$ quickly goes low, causing insufficient power converted to the secondary side, power controller 12a employing primary-side regulation might not acknowledge in time the falling of output voltage $V_{OUT}$, therefore introducing ripples to output voltage $V_{OUT}$. The ripples of output voltage $V_{OUT}$ must be constrained to meet specifications for ratings.

Figure 3:
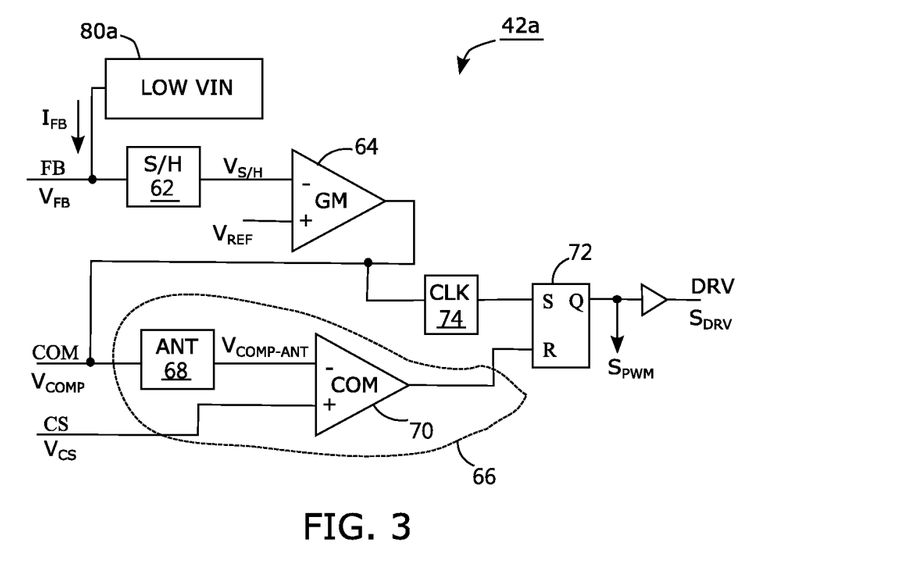
FIG. 3 shows power controller 42a capable of replacing power controller 12 in FIG. 1 according to embodiments of the invention.
Figure 4:
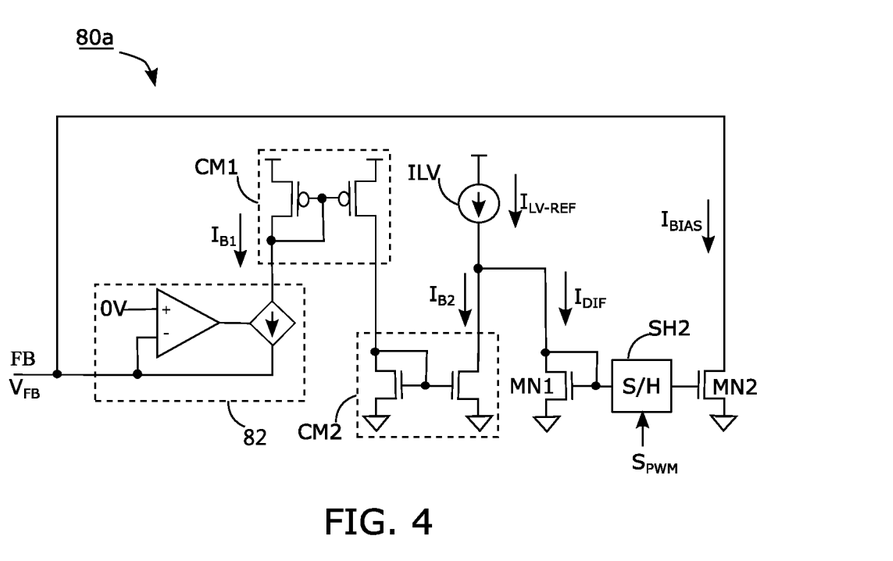
FIG. 4 shows low-line-voltage compensation circuit 80a in FIG. 3.
Figure 5:
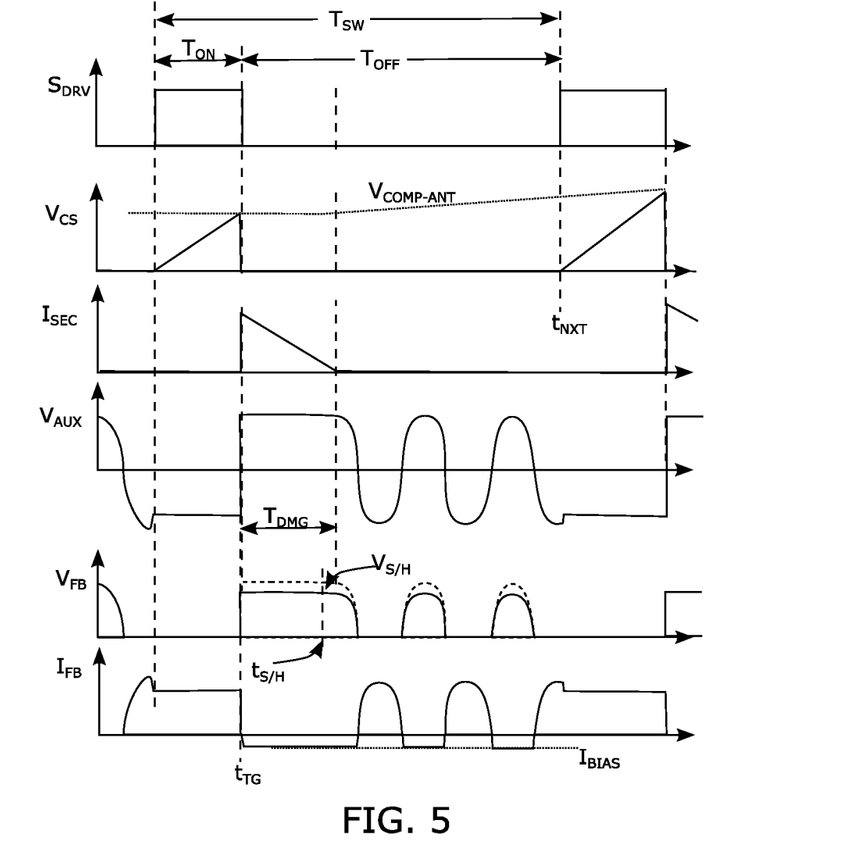

FIG. 3 shows power controller 42a capable of replacing power controller 12 in FIG. 1 according to embodiments of the invention. FIG. 4 shows low-line-voltage compensation circuit 80a in FIG. 3. FIG. 5 demonstrates some signal waveforms in FIG. 1 when power controller 12 in FIG. 1 is replaced by power controller 42a.

Some devices or circuits in power controller 42a of FIG. 3 are similar or the same with corresponding devices or circuits in power controller 12a of FIG. 2A, and their functions and operations are omitted hereinafter because they are self-explanatory in light of the teaching for power controller 12a.

Unlike power controller 12a, power controller 42a has low-line-voltage compensation circuit 80a to replace voltage clamper 65. Low-line-voltage compensation circuit 80a majorly has two purposes: line voltage $V_{LINE}$ detection; and lowering feedback voltage $V_{FB}$ when line voltage $V_{LINE}$ is lower than reference voltage $V_{L-REF}$, to generate a lower representative voltage $V_{S/H}$. Therefore, switching-mode power supply 10, while using power controller 42a, will deem output voltage $V_{OUT}$ not high enough when line voltage becomes quite low, and, in response, increases converted power supplied to generate output voltage $V_{OUT}$ in the next switching cycle. The falling of line voltage $V_{LINE}$ would not cause the falling of output voltage $V_{OUT}$, and the ripples of output voltage $V_{OUT}$ might be constrained or diminished.

Voltage clamper 82 in FIG. 4 is configured to make sure feedback voltage $V_{FB}$ is not negative all the time. When winding voltage $V_{AUX}$ is negative, voltage clamper 82 provided current $I_{B1}$ to hold feedback voltage $V_{FB}$ at about 0V. The reflection that current mirrors CM1 and CM2 provide to current $I_{B1}$ generates current $I_{B2}$. Reference current $I_{LV-REF}$ provided by current source ILV is deducted by current $I_{B2}$ to generate current $I_{DIF}$ flowing through sample-and-hold circuit SH2. Derivable in view of FIG. 4, current $I_{DIF}$ exists or is positive only if current $I_{B2}$ is less than reference current $I_{LV-REF}$, and is 0 A if current $I_{B2}$ exceeds reference current $I_{LV-REF}$. When winding voltage $V_{AUX}$ is negative, current $I_{DIF}$ can be calculated by the following equation (I).

$$\begin{aligned} I_{DIF} &= I_{LV-REF} - I_{B2} \\ &= I_{LV-REF} - K1 * I_{B1} \\ &= I_{LV-REF} - K2 * V_{LINE} \\ &= K2 * (V_{L-REF} - V_{LINE}), \end{aligned} \quad (I)$$

where K1 and K2 are constants, determined by device parameters; reference voltage $V_{L-REF}$ is also a constant corresponding to reference current $I_{LV-REF}$ and constant K2.

Low-line-voltage compensation circuit 80a equivalently compares reference voltage $V_{L-REF}$ with line voltage $V_{LINE}$ to generate current $I_{DIF}$.

During ON time $T_{ON}$, sample-and-hold circuit SH2 shorts gate electrodes of NMOS transistors MN1 and MN2 to each other. At the moment when ON time $T_{ON}$ ends, sample-and-hold circuit SH2 disconnects the gate electrode of NMOS transistor MN1 from the gate electrode of NMOS transistor MN2, and starts holding the gate voltage of NMOS transistor MN2. The gate voltage of NMOS transistor MN2 is kept unchanged during OFF time $T_{OFF}$. This invention is not limited to starting holding the gate voltage of NMOS transistor MN2 at the end of ON time $T_{ON}$. Some embodiments of the invention might start holding the gate voltage of NMOS transistor MN2 at any moment within ON time $T_{ON}$, as long as current $I_{DIF}$ have been steadily representing the difference between the reference voltage $V_{L-REF}$ and line voltage $V_{LINE}$. When winding voltage $V_{AUX}$ turns positive during OFF time $T_{OFF}$, offset current $I_{BIAS}$ pulled by NMOS transistor MN2 can be calculated by the following equation (II).

$$I_{BIAS}=K3*(V_{L-REF}-V_{LINE}) \quad (II),$$

where K3 is a constant determined by device parameters. In view of equation (II), offset current $I_{BIAS}$, used as a control signal, is in proportion to the difference between reference voltage $V_{L-REF}$ and line voltage $V_{LINE}$. When line voltage $V_{LINE}$ is lower than reference voltage $V_{L-REF}$ offset current $I_{BIAS}$, positive, is used to lower feedback voltage $V_{FB}$, and when line voltage $V_{LINE}$ is not lower than reference voltage $V_{L-REF}$ offset current $I_{BIAS}$ zero, has no influence to feedback voltage $V_{FB}$.

FIG. 5 illustrates some signal waveforms when FIG. 1 uses power controller 42a. For comparison, the waveform of feedback voltage $V_{FB}$ in FIG. 2B, which doesn't have low-line-voltage compensation circuit 80a, is duplicated in FIG. 5 as dotted lines in company with the waveform of feedback voltage $V_{FB}$ for power controller 42a. Supposed in FIG. 5 are that before moment $t_{TG}$, the end of ON time $T_{ON}$ in FIG. 5, compensation signal $V_{COMP}$ stays unchanged because representative voltage $V_{S/H}$ is about equal to reference voltage $V_{REF}$, and that at moment $t_{TG}$ line voltage $V_{LINE}$ is detected to be less than reference voltage $V_{L-REF}$. Therefore, during demagnetization time $T_{DMG}$, feedback current $I_{FB}$ is negative, representing offset current $I_{BIAS}$ flowing from feedback node FB into power controller 42a. In the meantime, offset current $I_{BIAS}$ also goes through voltage-dividing resistors 14 and 16, lowering feedback voltage $V_{FB}$ and representative voltage $V_{S/H}$ newly generated by sampling at sample moment $t_{S/H}$. As a result, representative voltage $V_{S/H}$ becomes lower than reference voltage $V_{REF}$ since sample moment $t_{S/H}$, causing transconductor 64 in FIG. 3 to charge compensation capacitor CCOM and to increase both compensation signals $V_{COMP}$ and $V_{COMP-ANT}$ after sample moment $t_{S/H}$, as shown in FIG. 5. The switching cycle after moment $t_{NXT}$ due to a higher compensation signal $V_{COMP-ANT}$, converts and supplies more power to output voltage $V_{OUT}$, so that output voltage $V_{OUT}$ is upheld, possibly reducing ripples of output voltage $V_{OUT}$.

Figure 6A:
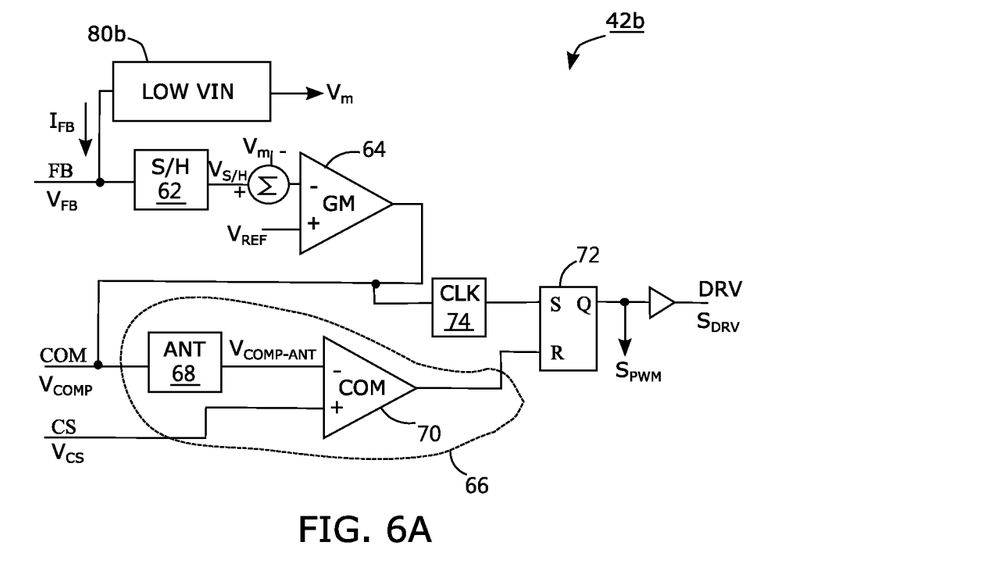
FIGS. 6A and 6B demonstrate power controllers 42b and 42c respectively, each capable of replacing power controller 12 in FIG. 1 according to embodiments of the invention.
Figure 6B:
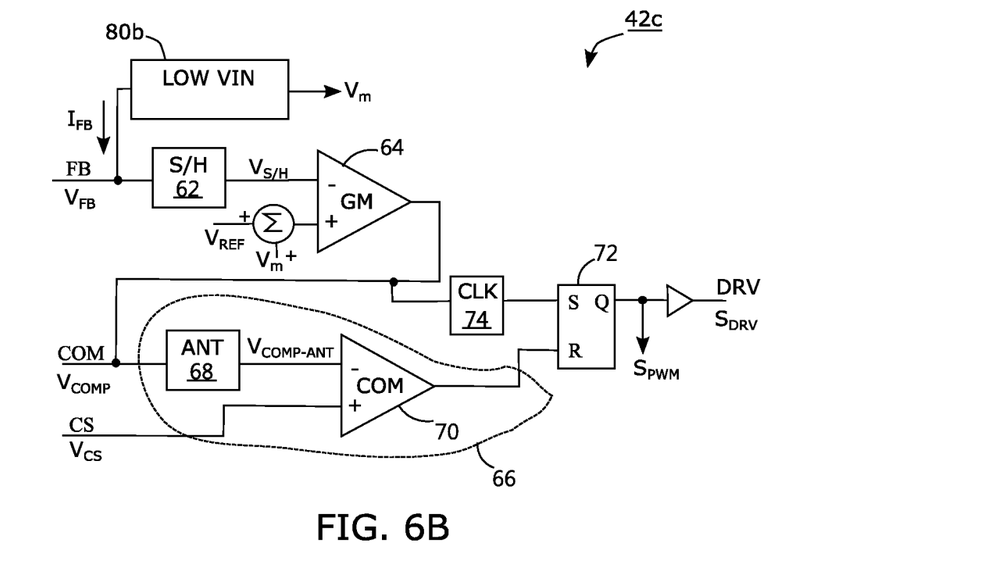

FIGS. 6A and 6B demonstrate power controllers 42b and 42c respectively, each capable of replacing power controller 12 in FIG. 1 according to embodiments of the invention. Some devices or circuits in power controllers 42b and 42c are similar or the same with corresponding devices or circuits in power controller 42a, and details for their functions and operations are omitted hereinafter because they are self-explanatory in light of the teaching for power controller 42a. Power controller 42b includes an adder connected between sample-and-hold circuit 62 and transconductor 64, and power controller 42c another adder connected between reference voltage $V_{REF}$ and transconductor 64.

Low-line-voltage compensation circuit 80b, included by each of power controllers 42b and 42c, detects line voltage $V_{LINE}$ to compare with reference voltage $V_{L-REF}$, and when finding line voltage $V_{LINE}$ is lower than reference voltage $V_{L-REF}$ low-line-voltage compensation circuit 80b provides positive offset voltage $V_m$. If line voltage $V_{LINE}$ is higher than reference voltage $V_{L-REF}$, offset voltage $V_m$ equals to 0V. In FIG. 6A, offset voltage $V_m$ equivalently reduces representative voltage $V_{S/H}$ that the inverted input of transconductor 64 receives. In FIG. 6B, offset voltage $V_m$ equivalently increases reference voltage $V_{REF}$ that the non-inverted input of transconductor 64 receives.

Figure 7:
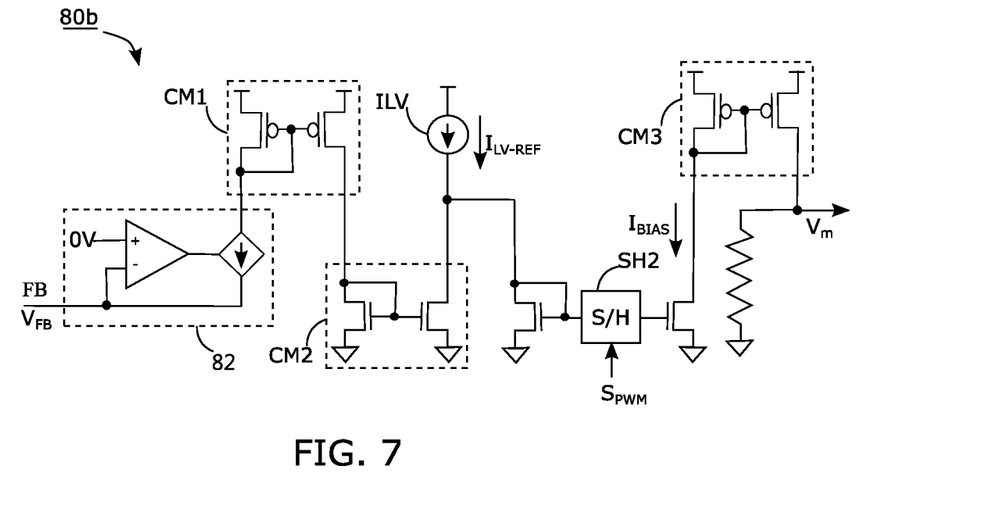
FIG. 7 demonstrates low-line-voltage compensation circuit 80b in FIG. 6A or 6B.

FIG. 7 demonstrates low-line-voltage compensation circuit 80b in FIG. 6A or 6B. Some devices or circuits in low-line-voltage compensation circuit 80b are similar or the same with corresponding devices or circuits in low-line-voltage compensation circuit 80a of FIG. 4, and details for their functions and operations are omitted hereinafter because they are self-explanatory in light of the teaching for low-line-voltage compensation circuit 80a. Derivable from FIG. 7, offset voltage $V_m$ can be calculated by the following equation (III), $$V_m=K4*I_{BIAS}=K5*(V_{L-REF}-V_{LINE}) \quad (III),$$

where K5 is a constant determined by device parameters. In view of equation (III), offset voltage $V_m$, used as a control signal, is in proportion to the difference between reference voltage $V_{L-REF}$ and line voltage $V_{LINE}$.

Figure 8:
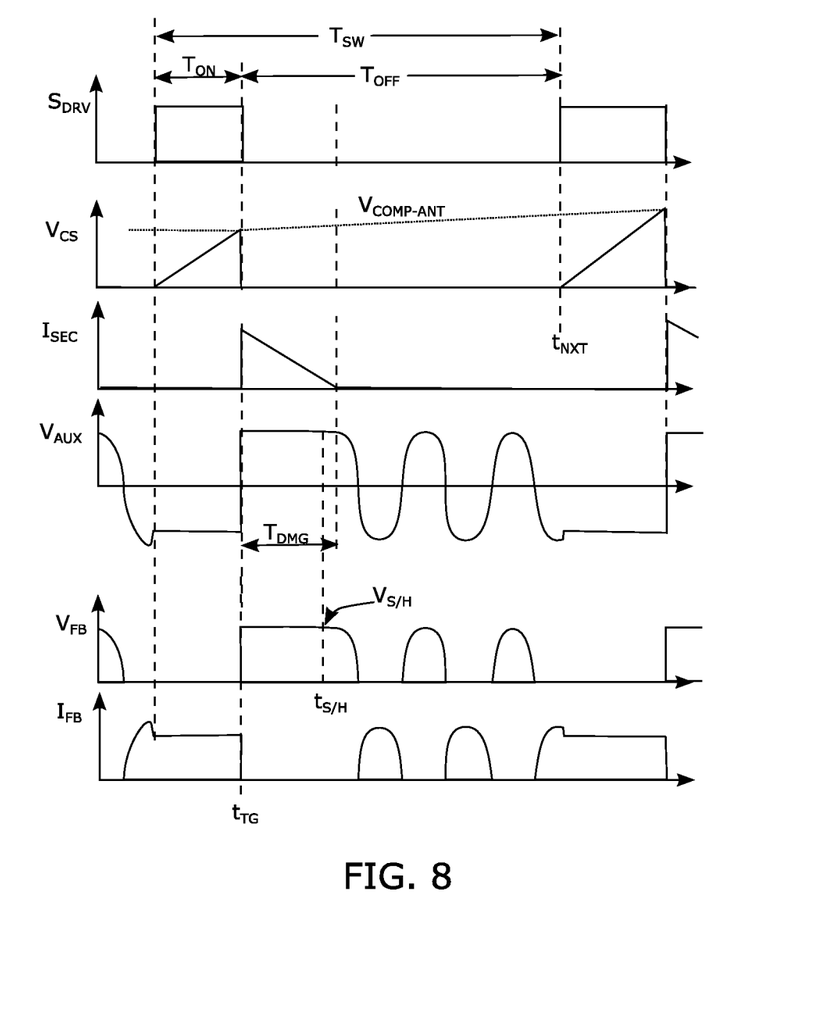
FIG. 8 illustrates some signal waveforms when FIG. 1 employs power controller 42b or 42c.

FIG. 8 illustrates some signal waveforms when FIG. 1 employs power controller 42b or 42c. Supposed in FIG. 8 are that before moment $t_{TG}$, the end of ON time $T_{ON}$, compensation signal $V_{COMP}$ stays unchanged because representative voltage $V_{S/H}$ is about equal to reference voltage $V_{REF}$, and that at moment $t_{TG}$ line voltage $V_{LINE}$ becomes less than reference voltage $V_{L-REF}$. Therefore, offset voltage $V_m$ becomes positive since moment $t_{TG}$, and starts adjusting representative voltage $V_{S/H}$ or reference voltage $V_{REF}$. Therefore, representative voltage $V_{S/H}$ seems to become less than reference voltage $V_{REF}$ at moment $t_{TG}$, causing transconductor 64 in FIG. 6A or 6B charging compensation capacitor CCOM to increase both compensation signals $V_{COMP}$ and $V_{COMP-ANT}$ after moment $t_{TG}$, as shown in FIG. 8. The switching cycle after moment $t_{NXT}$, due to a higher compensation signal $V_{COMP-ANT}$, has more power converted and supplied to output voltage $V_{OUT}$, so that output voltage $V_{OUT}$ is upheld, possibly reducing ripples of output voltage $V_{OUT}$.

Figure 9:
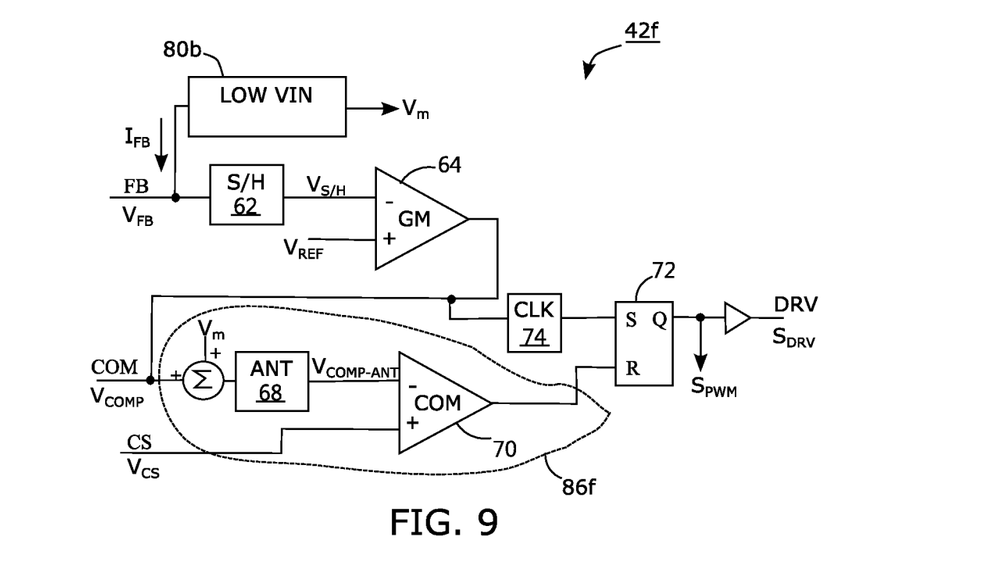
FIG. 9 demonstrates power controllers 42f, capable of replacing power controller 12 in FIG. 1 according to embodiments of the invention.

FIG. 9 demonstrates power controllers 42f, capable of replacing power controller 12 in FIG. 1 according to embodiments of the invention. Some devices or circuits in power controller 42f are similar or the same with corresponding devices or circuits in power controllers 42a, 42b, 42c and details of their functions and operations are omitted hereinafter because they are self-explanatory in light of the teaching for power controllers 42a, 42b, 42c.

Low-line-voltage compensation circuit 80b in power controllers 42f detects line voltage $V_{LINE}$ to compare with reference voltage $V_{L-REF}$, and when finding line voltage $V_{LINE}$ is lower than reference voltage $V_{L-REF}$ low-line-voltage compensation circuit 80b provides positive offset voltage $V_m$. If line voltage $V_{LINE}$ is higher than reference voltage $V_{L-REF}$, offset voltage $V_m$ is 0V. In FIG. 9, ON-time controller 86f has an adder to increase compensation voltage $V_{COMP}$ by offset voltage $V_m$ and to provide attenuator 68 the result. When line voltage $V_{LINE}$ is lower than reference voltage $V_{L-REF}$, offset voltage $V_m$ becomes positive, seemingly rising up compensation voltage $V_{COMP}$, so compensation signal $V_{COMP-ANT}$ is increased.

Figure 10:
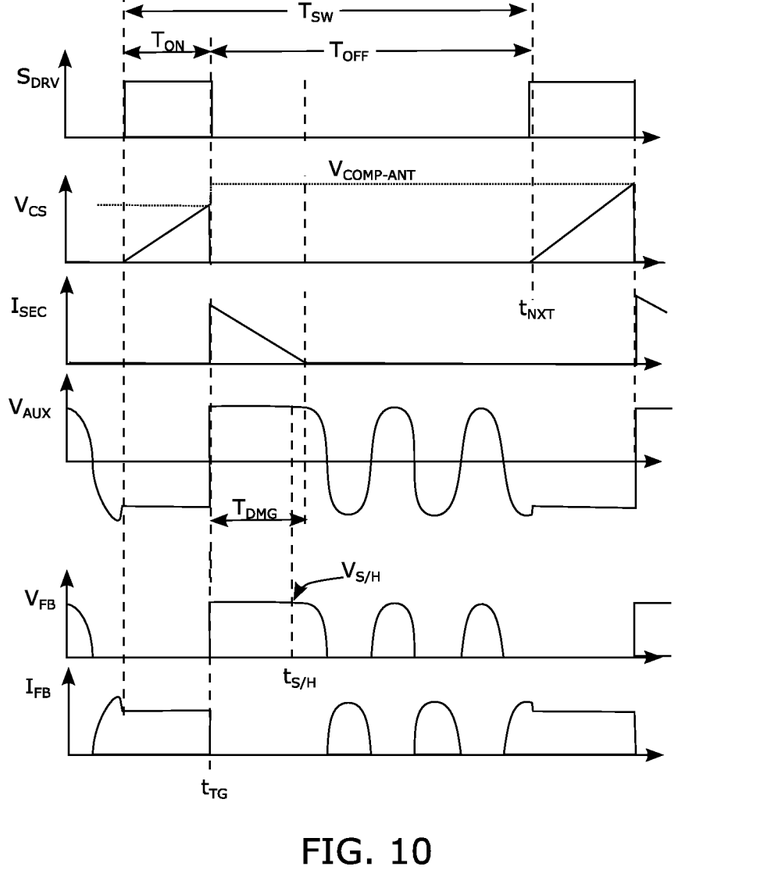
FIG. 10 illustrates some signal waveforms when FIG. 1 uses power controller 42f.

FIG. 10 illustrates some signal waveforms when FIG. 1 uses power controller 42f. Supposed in FIG. 10 are that before moment $t_{TG}$, the end of ON time $T_{ON}$, compensation signal $V_{COMP}$ stays unchanged because representative voltage $V_{S/H}$ is about equal to reference voltage $V_{REF}$, and that at moment $t_{TG}$ line voltage $V_{LINE}$ becomes less than reference voltage $V_{L-REF}$. Therefore, offset voltage $V_m$ becomes positive at moment $t_{TG}$, seemingly rising up compensation voltage $V_{COMP}$ and causing an upward step in the waveform of compensation signal $V_{COMP-ANT}$ at moment $t_{TG}$, as shown in FIG. 10. The switching cycle after moment $t_{NXT}$, due to a higher compensation signal $V_{COMP-ANT}$, converts and supplies more power to output voltage $V_{OUT}$, so that output voltage $V_{OUT}$ is upheld, possibly reducing ripples of output voltage $V_{OUT}$.

Figure 11A:
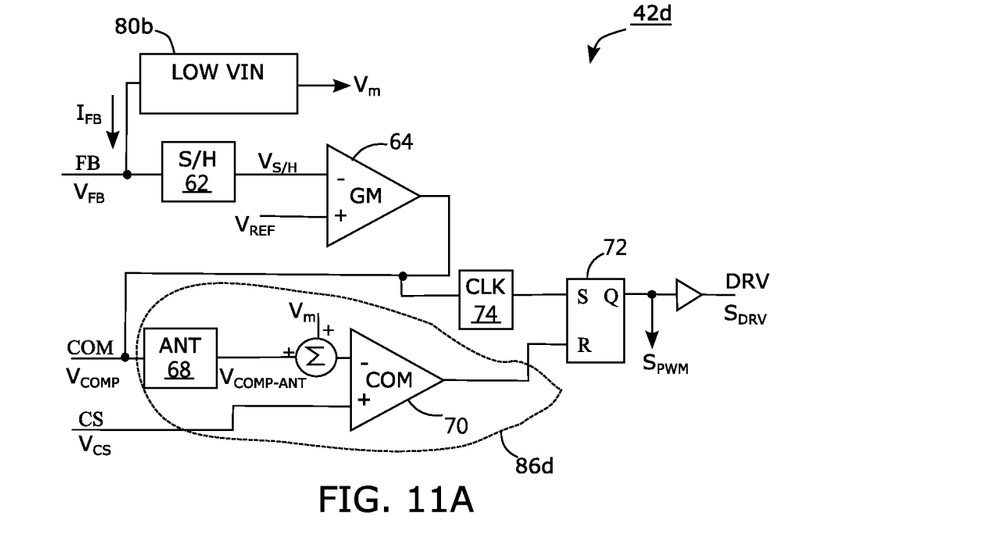
FIGS. 11A and 11B demonstrate power controllers 42d and 42g respectively, each capable of replacing power controller 12 in FIG. 1 according to embodiments of the invention.
Figure 11B:
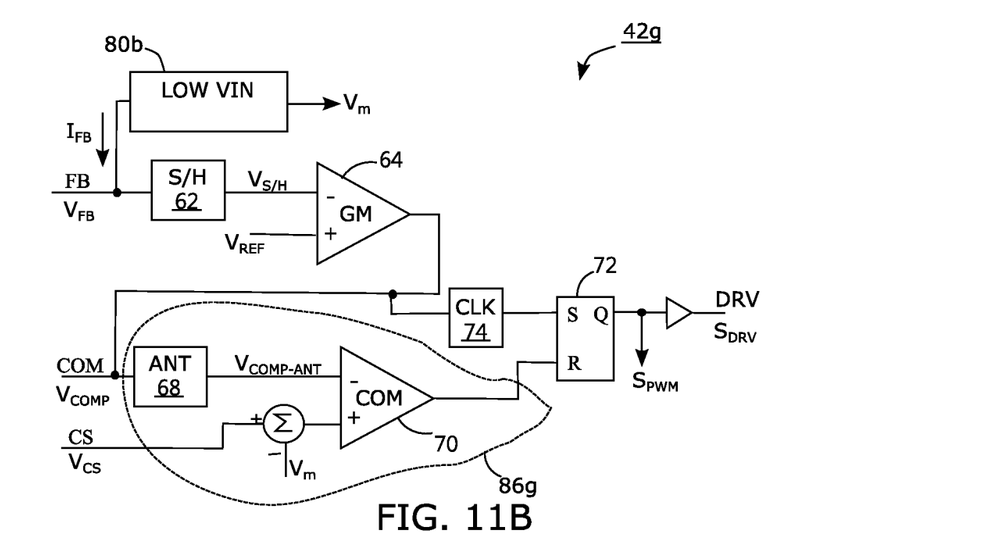

FIGS. 11A and 11B demonstrate power controllers 42d and 42g respectively, each capable of replacing power controller 12 in FIG. 1 according to embodiments of the invention. Some devices or circuits in power controllers 42d and 42g are similar or the same with corresponding devices or circuits in power controller 42c in FIG. 6B, and details of their functions and operations are omitted hereinafter because they are self-explanatory in light of the teaching for power controller 42c. Both power controllers 42d and 42g are capable of reducing ripples of output voltage $V_{OUT}$ for a switching-mode power supply.

As shown in FIG. 11A, ON-time controller 86d of power controller 42d includes an adder connected between attenuator 68 and comparator 70. ON-time controller 86g of power controller 42g in FIG. 11B has an adder connected between current-sensing node CS and comparator 70. In FIG. 11A, when finding line voltage $V_{LINE}$ is lower than reference voltage $V_{L-REF}$ low-line-voltage compensation circuit 80b provides offset voltage $V_m$, which is positive, to increase compensation signal $V_{COMP-ANT}$ that comparator 70 receives. In FIG. 11B, offset voltage $V_m$ is provided to decrease current-sensing signal $V_{CS}$ instead that comparator 70 receives.

Figure 11C:
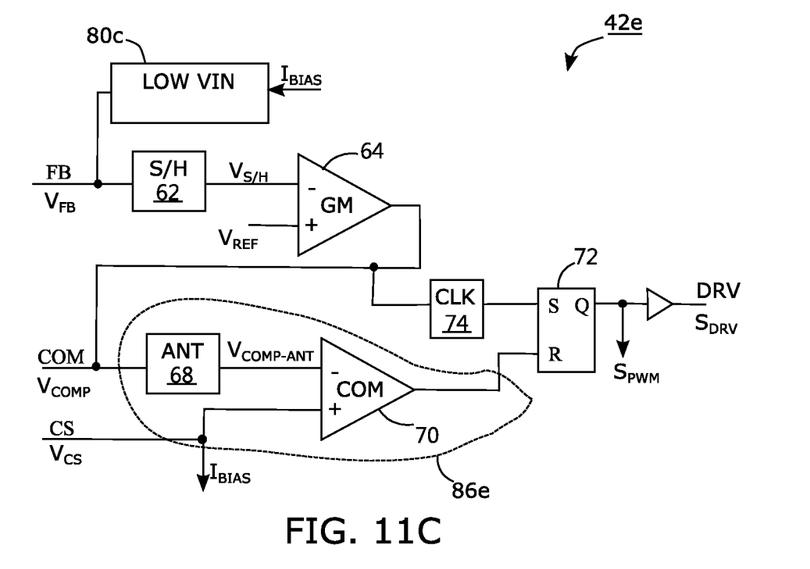
FIG. 11C demonstrates power controllers 42e, capable of replacing power controller 12 in FIG. 1 according to embodiments of the invention.
Figure 12:
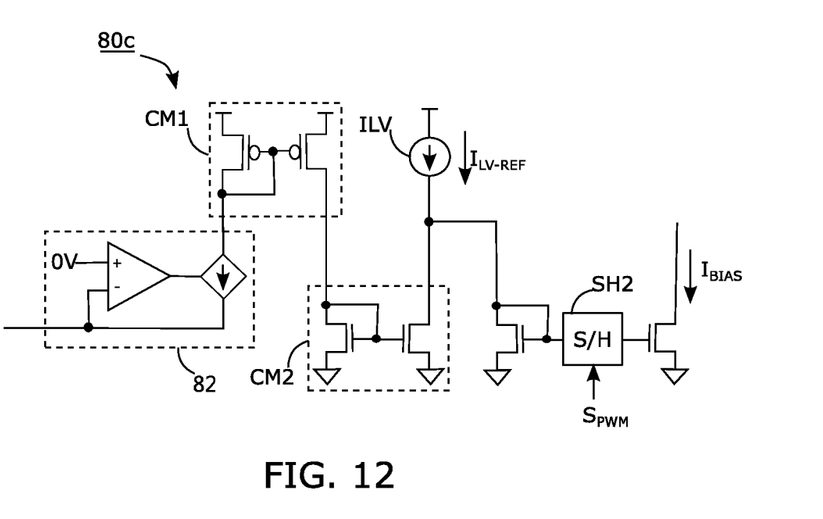
FIG. 12 shows low-line-voltage compensation circuit 80c in FIG. 11C.

FIG. 11C demonstrates power controllers 42e, capable of replacing power controller 12 in FIG. 1 according to embodiments of the invention. Some devices or circuits in power controller 42e are similar or the same with corresponding devices or circuits in the aforementioned power controllers and details of their functions and operations are omitted hereinafter because they are self-explanatory in light of the aforementioned teaching. FIG. 12 shows low-line-voltage compensation circuit 80c in FIG. 11C. Some devices or circuits in low-line-voltage compensation circuit 80c are similar or the same with corresponding devices or circuits in low-line-voltage compensation circuit 80a in FIG. 4 and details of their functions and operations are omitted hereinafter because they are self-explanatory in light of the teaching of low-line-voltage compensation circuit 80a.

Power controllers 42e in FIG. 11C is equivalent, functionally and operationally, to power controller FIG. 42g in FIG. 11B. when finding line voltage $V_{LINE}$ is lower than reference voltage $V_{L-REF}$ low-line-voltage compensation circuit 80c provides offset current $I_{BIAS}$, which goes through current-sensing node CS and resistor RCC, and effectively reduces current-sensing signal $V_{CS}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method in use of a switching-mode power supply to supply an output voltage to a load:
    detecting a line voltage generated by rectifying an alternating-current voltage;
    comparing the line voltage with a first reference voltage; and
    generating a control signal when the line voltage is less than the first reference voltage, in order to increase converted power that the switching-mode power supply provides to the output voltage;
    wherein the control signal is directly proportional to a difference between the first reference voltage and the line voltage when the line voltage is less than the first reference voltage.

2. The control method as claimed in claim 1, wherein the control signal has no influence to the converted power when the line voltage is more than the first reference voltage.

3. The control method as claimed in claim 1, wherein the switching-mode power supply includes a primary winding, a secondary winding, an auxiliary winding, and a resistor connecting a feedback node to the auxiliary winding, the control method comprising:
    detecting the line voltage from the feedback node;
    detecting the output voltage from the feedback node to generate a representative voltage;
    comparing the representative voltage with a second reference voltage; and
    when the line voltage is less than the first reference voltage, performing at least one of the following steps comprising:
        reducing the representative voltage in response to the control signal; and
        increasing the second reference voltage in response to the control signal.

4. The control method as claimed in claim 1, wherein the switching-mode power supply includes a power switch, and the control method further comprises:
    comparing a compensation signal with a current-sensing signal to determine an ON time of the power switch, wherein the compensation signal is generated by comparing the output voltage with a target voltage, and the current-sensing signal is capable of representing an inductor current flowing through a primary winding; and
    when the line voltage is less than the first reference voltage, performing at least one of the following steps comprising:
        reducing the current-sensing signal in response to the control signal; and
        increasing the compensation signal in response to the control signal.

5. The control method as claimed in claim 1, further comprising:
    providing a PWM signal to control an ON time and an OFF time of a power switch; and
    holding the control signal after a predetermined moment during the ON time.

6. The control method as claimed in claim 5, when the predetermined moment is about an end of the ON time.

7. The control method as claimed in claim 1, wherein the switching-mode power supply includes a primary winding, a secondary winding, an auxiliary winding, and a resistor connected a feedback node to the auxiliary winding, the control method comprising:
- detecting the line voltage from the feedback node;
- detecting the output voltage from the feedback node to generate a representative voltage;
- comparing the representative voltage with a second reference voltage to generate a compensation signal;
- wherein the control signal lowers a feedback voltage at the feedback node when the line voltage is less than the first reference voltage.

8. A power controller in use of a switching-mode power supply for supplying an output voltage to a load, the power controller comprising:
- a feedback node, connected to an auxiliary winding via a resistor; and
- a low-line-voltage compensation circuit connected to the feedback node, for comparing a line voltage with a first reference voltage, and generating a control signal when the line voltage is less than the first reference voltage, to increase converted power that the switching-mode power supply provides to the output voltage;
- wherein the control signal is directly proportional to a difference between the first reference voltage and the line voltage when the line voltage is less than the first reference voltage.

9. The power controller as claimed in claim 8, wherein the low-line-voltage compensation circuit lowers a feedback voltage at the feedback node when the line voltage is less than the first reference voltage.

10. The power controller as claimed in claim 8, comprising:
- a transconductor for comparing a representative voltage with a second reference voltage to generate a compensation signal;
- wherein the representative voltage is capable of representing the output voltage, and when the line voltage is less than the first reference voltage the representative voltage is reduced or the second reference voltage is increased in response to the control signal.

11. The power controller as claimed in claim 8, wherein the power controller provides a PWM signal to control an ON time and an OFF time of a power switch, the power controller further comprising:
- a transconductor for comparing a representative voltage with a second reference voltage to generate a compensation signal; and
- an ON-time controller determining the ON time in response to the compensation signal and a current-sensing signal;
- wherein the representative voltage is capable of representing the output voltage;
- the current-sensing signal is capable of representing an inductor current flowing through a primary winding; and
- the control signal is used to reduce the current-sensing signal or increase the compensation signal.

12. The power controller as claimed in claim 8, wherein the power controller provides a PWM signal to control an ON time and an OFF time of a power switch, and the low-line-voltage compensation circuit comprises a sample-and-hold circuit that starts holding the control signal after a predetermined moment during the ON time.

13. A switching-mode power supply generating an output voltage to a load, the switching-mode power supply comprising:
- an inductive device comprising a primary winding, an auxiliary winding and a secondary winding;
- a power switch connected in series with the primary winding between a line voltage and an input ground;
- a power controller providing a PWM signal to control an ON time and an OFF time of the power switch, the power controller comprising:
  - a feedback node coupled to the auxiliary winding, wherein the power controller detects the output voltage through the feedback node to generate a compensation signal;
  - an ON-time controller controlling the ON time in response to the compensation signal; and
  - a low-line-voltage compensation circuit, connected to the feedback node, for detecting the line voltage, comparing the line voltage with a first reference voltage, and generating a control signal when the line voltage is less than the first reference voltage, to increase converted power that the switching-mode power supply provides to the output voltage;
  - wherein the control signal is directly proportional in proportion to a difference between the first reference voltage and the line voltage when the line voltage is less than the first reference voltage.

14. A switching-mode power supply generating an output voltage to a load, the switching-mode power supply comprising:
- an inductive device comprising a primary winding, an auxiliary winding and a secondary winding;
- a power switch connected in series with the primary winding between a line voltage and an input ground;
- a power controller providing a PWM signal to control an ON time and an OFF time of the power switch, the power controller comprising:
  - a feedback node coupled to the auxiliary winding, wherein the power controller detects the output voltage through the feedback node to generate a compensation signal;
  - an ON-time controller controlling the ON time in response to the compensation signal; and
  - a low-line-voltage compensation circuit, connected to the feedback node, for detecting the line voltage, comparing the line voltage with a first reference voltage, and generating a control signal when the line voltage is less than the first reference voltage, to increase converted power that the switching-mode power supply provides to the output voltage;
  - wherein the control signal is directly proportional to a difference between the first reference voltage and the line voltage when the line voltage is less than the first reference voltage.

15. The switching-mode power supply as claimed in claim 14, wherein the control signal lowers a feedback voltage at the feedback node when the line voltage is less than the first reference voltage.

16. The switching-mode power supply as claimed in claim 14, wherein the ON-time controller controls the ON time in response to the compensation signal and a current-sensing signal capable of representing a current through the primary winding, and, when the line voltage is less than the first reference voltage, the control signal increases the compensation signal or reduces the current-sensing signal.

17. The switching-mode power supply as claimed in claim 14, wherein the power controller further comprises:

a sample-and-hold circuit sampling a feedback voltage at the feedback node to hold a representative voltage;

a transconductor for comparing the representative voltage with a second reference voltage to generate the compensation signal;

wherein when the line voltage is less than the first reference voltage the control signal is used to increase the second reference voltage or reduce the representative voltage.

18. The switching-mode power supply as claimed in claim 14, wherein the low-line-voltage compensation circuit comprises a sample-and-hold circuit holding a gate voltage during the OFF time.

19. The switching-mode power supply as claimed in claim 18, wherein the low-line-voltage compensation circuit comprises:

a voltage clamper providing a first current to hold a feedback voltage at the feedback node at about 0V during the ON time; and a current mirror mirroring the first current to generate a second current, wherein a reference current is deducted by the second current to generate a third current flowing through the sample-and-hold circuit.

20. The power controller as claimed in claim 8, wherein the control signal has no influence to the converted power when the line voltage is more than the first reference voltage.

* * * * *